Nov. 22, 1949  W. H. RODEFELD  2,488,939
HAY TAKE-UP MACHINE
Filed Feb. 6, 1946  2 Sheets-Sheet 1
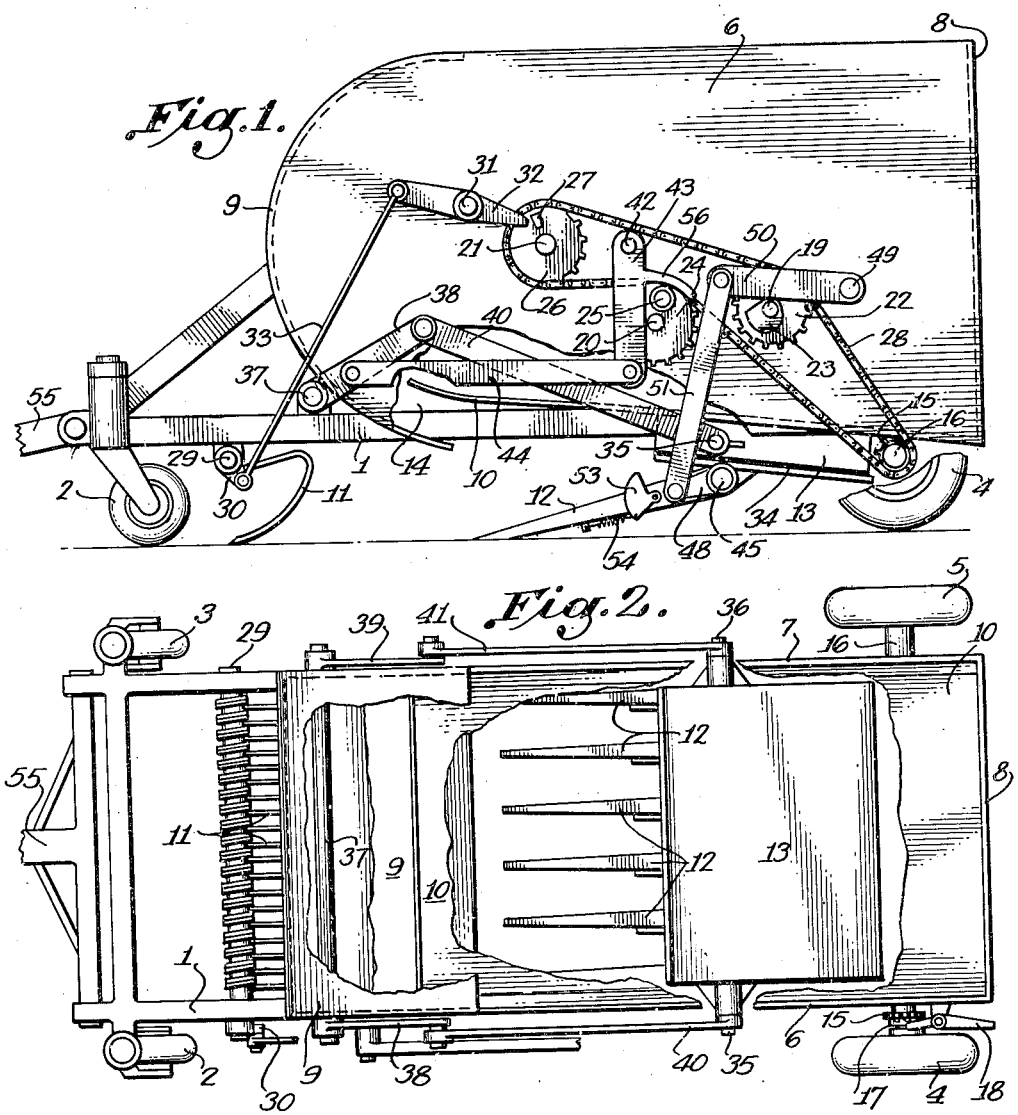
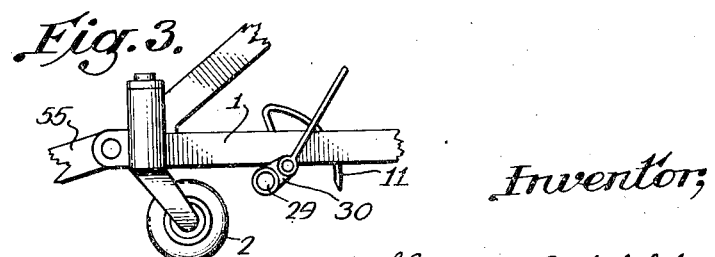
Inventor;
William H. Rodefeld.

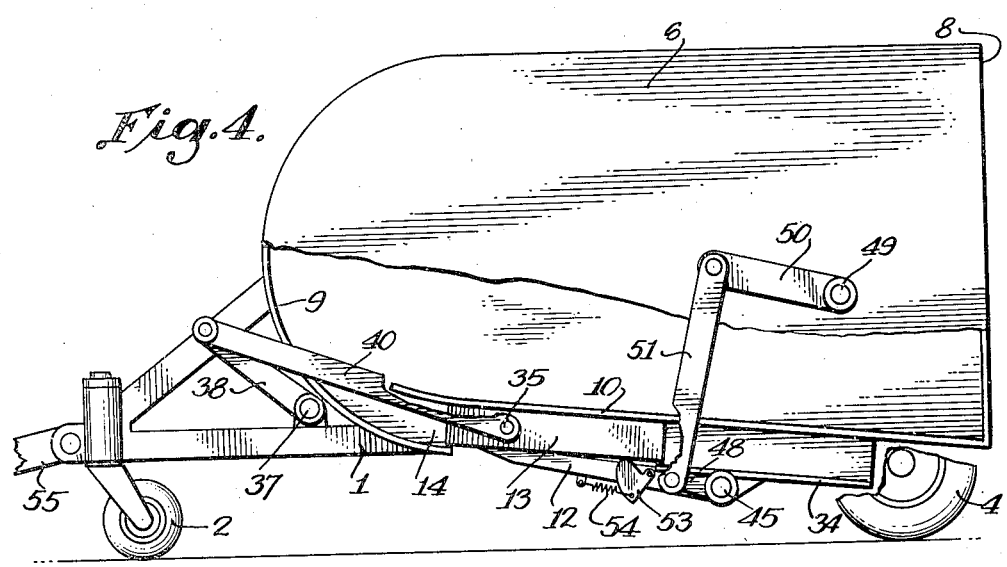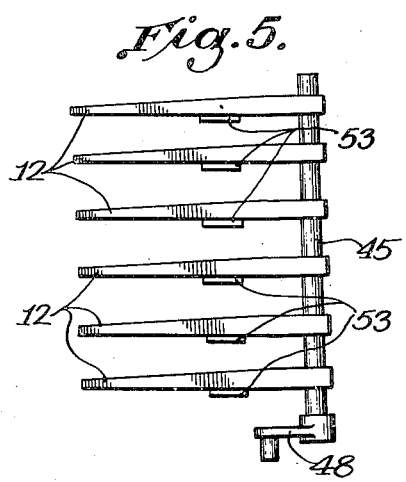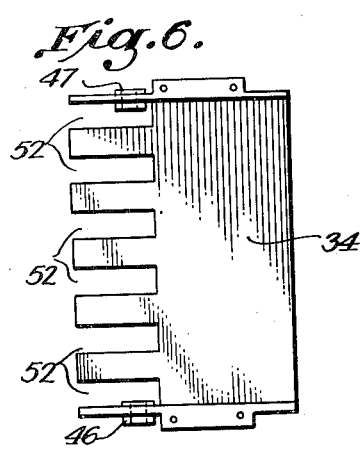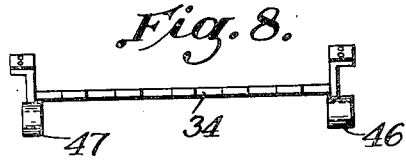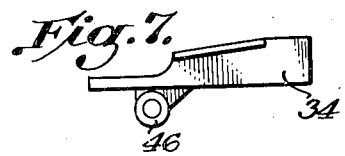

Patented Nov. 22, 1949

2,488,939

UNITED STATES PATENT OFFICE 2,488,939

HAY TAKE-UP MACHINE

William H. Rodefeld, Richmond, Ind.

Application February 6, 1946, Serial No. 645,901

4 Claims. (Cl. 214—79)

My present invention relates to machinery for harvesting hay and similar material.

The principal object of this invention is to provide means with which one man can harvest hay or similar material rapidly and efficiently.

A further object is to provide a machine that will take up hay and similar material direct from the mower swath without previous raking being first required.

A further object is to provide a machine with which hay can be harvested with a minimum of handling and disturbance of the hay with the result that with leafy hay more of the valuable leaves are saved than when such hay is harvested by methods requiring more handling.

A further object is to provide a machine that compacts the material as it takes it up.

A further object is to provide a machine in which material is removed from a set of tines by being pushed from the ends of the said tines in the direction that the said tines extend when the material is being removed therefrom.

I attain these objects by mechanism illustrated in the two accompanying sheets of drawings, in which:

Figure 1 is a side view of the machine with some parts cut away to better illustrate this invention and shows a wheeled chassis with a compartment to receive material taken up, a set of raking teeth near the front of the chassis with the said teeth being in position to rake material as the machine moves forward and being arranged to rise at intervals and drop the raked material bunched, a set of tines to take up raked material and arranged to then swing upward and elevate the material and a ram to remove material from the said tines and push it into the receiving compartment through an opening between the bottom of a curved front of the receiving compartment and the front end of the floor of the receiving compartment and mechanism to raise the raking teeth and the tines and operate the ram.

Figure 2 is a top view of the machine with most of the floor of the receiving compartment cut away and with two sections cut out of the curved front and with only part of the operating mechanism showing.

Figure 3 is a partial side view showing only the front part and showing the raking teeth in raised position to drop raked material.

Figure 4 is a partial side view with the lower part of the side of the receiving compartment cut away and shows the tines in raised position and the ram in forward position.

Figure 5 is a top view of the set of tines.

Figure 6 shows a supporting floor for the ram when it is in rear position. This part bolts up under the chassis frame and in addition to providing a supporting floor for the ram it also carries two bearings that support the shaft of the set of tines. The rear parts of the tines come up in the slots in the forward end of the ram supporting floor when the tines are raised.

Figure 7 is a side view of the ram supporting floor.

Figure 8 is a front end view of the ram supporting floor.

Similar numerals refer to similar parts throughout the several views.

Number 1 is the frame of the chassis, 2 and 3 are front wheels, 4 and 5 are rear wheels, 6 and 7 are sides of the receiving compartment, 8 is the rear end of the receiving compartment, 9 is the curved front end of the receiving compartment, 10 is the floor of the receiving compartment.

Number 11 shows the raking teeth, 12 the tines that take up bunched material, 13 is the ram that pushes material forward from the tines 12 and through the open passage 14 between the floor 10 and the curved front 9.

A sprocket 15 is mounted on the rear axle 16 and a jaw clutch arrangement 17 and 18 permits engagement or disengagement of the sprocket 15 and the rear axle 16 to put the machine in or out of gear.

Three sprocket carrying stub shafts extend from the side 6 of the receiving compartment. A sprocket 22 mounted on stub shaft 19 carries a cam 23. A sprocket 24 mounted on stub shaft 20 carries an eccentrically positioned roller 25. A sprocket 26 mounted on stub shaft 21 carries a lug 27. Sprockets 15, 22, 24 and 26 are connected by a chain 28.

The raking teeth 11 are secured to a shaft 29 which extends across the chassis frame near the front thereof, on one end of shaft 29 is an arm 30.

A stub shaft 31 extending from the side 6 of the receiving compartment carries a rocker arm 32 which is connected to arm 30 of the raking teeth shaft 29 by a rod 33. When the sprocket 26 rotates the lug 27 thereon strikes the end of the rocker arm 32 and moves it to raise the raking teeth 11 through the connections just described.

A shaft 45 extends across the machine under the ram supporting floor 34 and the shaft 45 is carried by bearings 46 and 47 on the under side of the ram supporting floor 34. Secured to the shaft 45 are the tines 12 and an arm 48.

The tines 12 extend forward and with their points at the ground take up bunched material dropped by the raking teeth 11 as the machine moves forward.

Extending from the side of the receiving compartment 6 is a stub shaft 49, mounted thereon and extending forward over the cam 23 on the sprocket 22 is an arm 50, connecting arm 50 and arm 48 on the tines shaft 45 is a link 51.

When the sprocket 22 rotates the cam 23 raises arm 50 and through the link 51 and the arm 48 the tines 12 are raised and the cam 23 is shaped so as to hold the tines 12 in raised position during part of the rotation of cam 23.

When the tines 12 are raised their rear upper parts come up in the slots 52 in the ram supporting floor 34. The top surfaces of tines 12 form a continuation of the top surface of the ram supporting floor 34 to make a continuous surface for the ram 13 to slide on.

On each tine 12 is a stop 53 that prevents material from sliding too far up on tines 12.

After the tines 12 have taken up a bunch of material they swing up and the material thereon is compressed between the top of the tines 12 and the bottom of the floor 10 of the receiving compartment.

When ram 13 is in rear position it is supported by the supporting floor 34.

Extending from the sides of ram 13 are trunnions 35 and 36.

Extending across the chassis frame near the front thereof is a shaft 37. Secured to the ends of shaft 37 are arms 38 and 39. Connecting the upper ends of arms 38 and 39 with the trunnions 35 and 36 on the ram 13 are links 40 and 41.

Extending from the side 6 of the receiving compartment is a stub shaft 42 and mounted thereon is an arm 43. Connecting arm 43 and arm 38 is a link 44.

When sprocket 24 rotates the roller 25 thereon strikes the main part of the arm 43 and swings it forward and through the connections just described the ram 13 is slid forward over the top of the tines 12 when they are up and this action removes material therefrom and puts it through the passage 14 and into the receiving compartment. The ram 13 then returns to rearward position and then the tines 12 return to the ground for the next bunch of material.

The ram 13 is returned to rearward position by the roller 25 bearing against the rearward extending part 56 of arm 43.

When the ram 13 moves forward the stops 53 are pushed down to the position shown in Figure 4 and when the ram 13 returns to rearward position the stops 53 are swung up to the position shown in Figure 1 by springs 54.

The material is further compressed when it is pushed through the passage 14 and the compressed state thereof prevents its falling out when the tines 12 return to the ground.

Number 55 is a tongue shown partly cut away that provides means for connecting the machine to a tractor or other pulling means.

The curved front 9 of the receiving compartment prevents material from jamming in the front thereof.

Having now shown and described the invention, what I claim, and desire to secure by Letters Patent of the United States is:

1. In a machine to take up hay and similar material, a set of tines extending forward and arranged so that the points thereof can be at the ground to take up material as the machine moves forward and means to raise the said tines and means to push the material forward from the said tines after they have been raised.

2. In a machine to take up hay and similar material, a set of tines extending forward and arranged so that the points thereof can be at the ground to pass under material as the machine moves forward and so that the said tines can be raised, an opening into a receiving compartment with the said opening being forward of and substantially in line with the top of the said tines after they have been raised and means to push material form the said tines and into and through the said opening.

3. In a machine to take up hay and similar material, a set of tines arranged to pass under material on the ground and then rise and raise the said material and with a surface being above the said tines and substantially parallel therewith when the said tines are in raised position and a device to pass between the said surface and the top of the said tines to remove material therefrom.

4. In a machine to take up hay and similar material, a set of forwardly extending tines arranged so that the points thereof slide on the ground, when the machine moves forward, to pass under material on the ground, means to raise the said tines to a forwardly extending position with the points thereof off the ground, means to push material forward from the said tines with the said material being pushed along the said tines to the points thereof and then from the said tines at the points thereof.

WILLIAM H. RODEFELD.

REFERENCES CITED

The following references are of record in the file of this patent:

UNITED STATES PATENTS

| Number | Name | Date |
|---|---|---|
| 26,225 | Althouse | Nov. 22, 1859 |
| 54,392 | Nevergold et al. | May 1, 1866 |
| 2,312,390 | Cordes | Mar. 2, 1943 |
| 2,405,756 | Rodefeld | Aug. 13, 1946 |